United States Patent [19]
Press

[11] Patent Number: 4,643,457
[45] Date of Patent: Feb. 17, 1987

[54] JOINT FOR PLASTIC LINED METAL PIPING WITH REDUCED DIAMETER PIPE LAP

[75] Inventor: Irving D. Press, West Orange, N.J.

[73] Assignee: Unidynamics Corporation, New York, N.Y.

[21] Appl. No.: 870,667

[22] Filed: Jun. 2, 1986

Related U.S. Application Data

[63] Continuation of Ser. No. 633,395, Jul. 23, 1984, abandoned.

[51] Int. Cl.$^4$ .......................... F16L 9/14; F16L 23/00
[52] U.S. Cl. ........................................ 285/55; 285/412
[58] Field of Search ..................... 285/55, 368, 412

[56] References Cited

U.S. PATENT DOCUMENTS

| | | | |
|---|---|---|---|
| 2,356,047 | 8/1944 | Geisinger et al. | 285/55 X |
| 2,998,984 | 9/1961 | Gressel | 285/55 |
| 3,702,199 | 11/1972 | Brooks et al. | 285/55 |
| 4,288,105 | 9/1981 | Press | 285/55 |
| 4,313,625 | 2/1982 | West | 285/55 |
| 4,494,776 | 1/1985 | Press | 285/55 |

FOREIGN PATENT DOCUMENTS 348844 10/1960 Switzerland .......................... 285/55

Primary Examiner—Thomas F. Callaghan
Attorney, Agent, or Firm—Hopgood, Calimafde, Kalil, Blaustein & Judlowe

[57] ABSTRACT

A seal load ring having parallel radial faces is installed between the flared gasket portion of the piping plastic liner and the lapped end of a section of metal piping. The plastic engaging face of the ring is provided with a plurality of concentric circular grooves to resist plastic cold flow. The pipe lap has a significantly lesser outside diameter than the outside diameter of the seal load ring, only sufficient to support the joint connecting forces, thereby permitting easier and more economical fabrication of the pipe lap and permitting the use of less ductile less expensive pipe.

10 Claims, 9 Drawing Figures

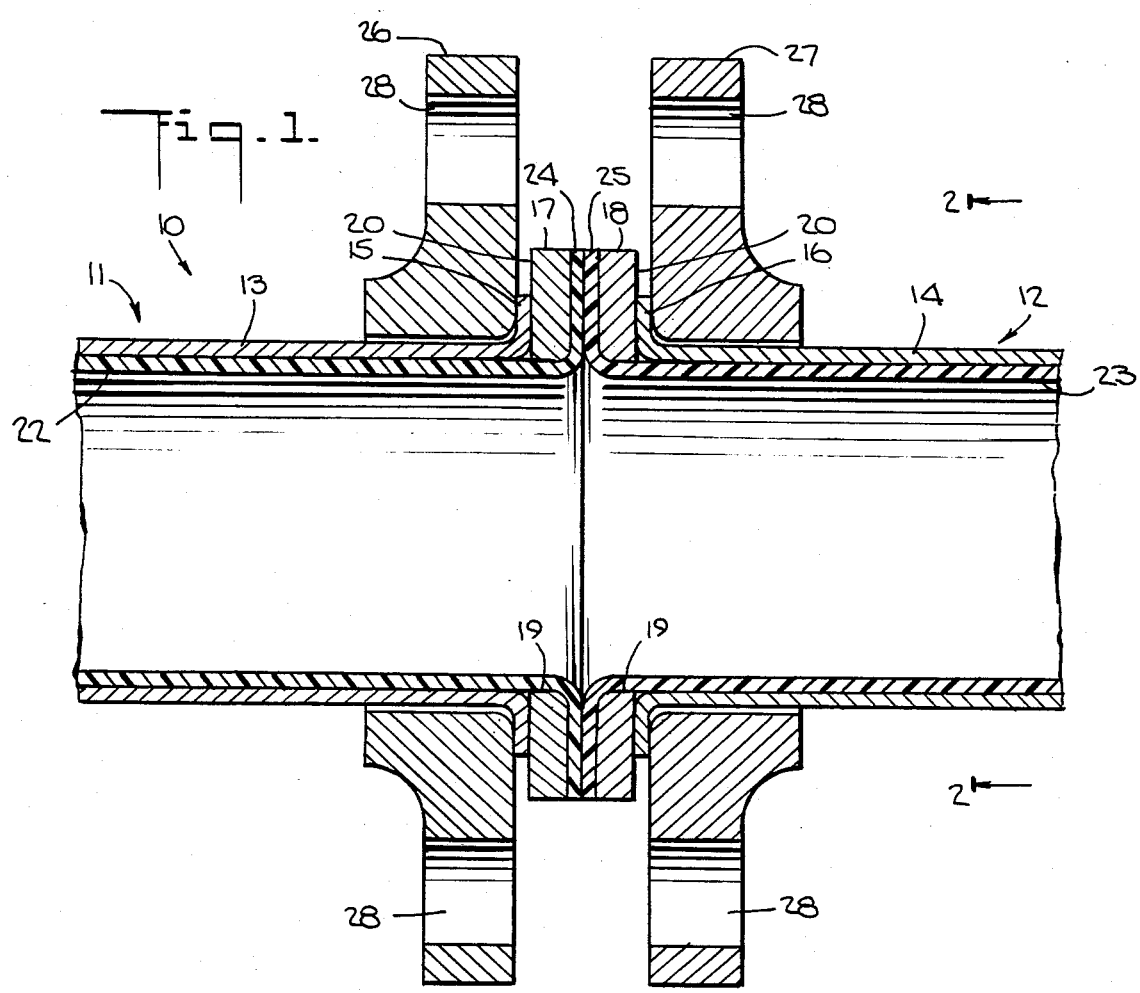
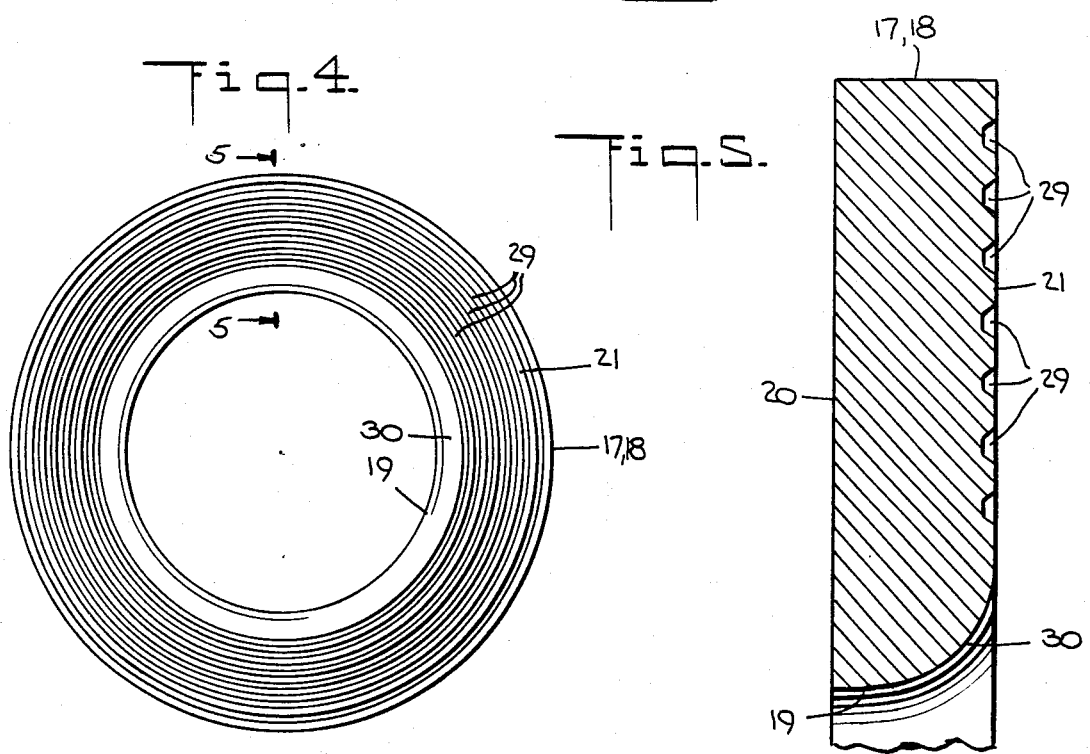

JOINT FOR PLASTIC LINED METAL PIPING WITH REDUCED DIAMETER PIPE LAP

This application is a continuation of application Ser. No. 633,395, filed Jul. 23, 1984, now abandoned.

BACKGROUND OF THE INVENTION

The present invention relates to fluid piping systems and more particularly to piping systems of the type wherein a metallic housing is lined with a non-metallic material selected from the group consisting of elastomers and plastomers.

Lined piping systems of the foregoing type that are presently in use are generally fabricated from Schedule 40 or Schedule 80 carbon steel and lined with various chemically resistant plastics having nominal wall thicknesses usually ranging from about 0.054" for ½" pipe to about .185" or greater for a 12" pipe for polytetrafluoroethylene (PTFE) resin, and thicker for other resins such as polypropylene. Occasionally, Schedule 10 carbon steel has been used. Generally, connections are made between sections of such pipe by flange joints, in which case the lining is brought out of the pipe and flared over the face of the flange both to protect the metal from the fluids being carried and to serve as a gasket. The flanges have been predominantly of the bolted kind, and at one time it was considered desirable to include a fibrous backup washer around the liner between the metal flange face and the overlying plastic flare to compensate for cold flow of the plastic.

The known piping is quite heavy, and bolting up standard flanges requires considerable man hours to effect a typical installation. However, there has been a general reluctance in the market place to trust joints other than bolted flanges. Nevertheless, there is a need, particularly in the light of rising costs of capital improvements, for a lighter weight, more quickly assembleable, plastic lined piping system.

An early attempt in this direction is represented by the pipe assembly disclosed in U.S. Pat. No. 4,313,625 issued Feb. 2, 1982. The abstract of said patent refers to a lined pipe assembly wherein the lined pipe and liner are deformed to provide an outwardly flaring flange, a loose tapered ring is disposed on the pipe adjacent the flange and the pipe is joined to a similar pipe or cast fitting by means of a split "V" clamp. However, loose rings are the bane of the workman. If they are made sufficiently snug to restrict travel along the pipe there is the risk that they will hang up on the pipe when the joint is assembled preventing the development of a uniformly sealed joint. Therefore, a certain looseness is required and it becomes a problem to hold the rings in place until the "V" clamp can be installed.

A significant improvement over said patented pipe assembly was the basis of a copending patent application, Ser. No. 496,883, filed May 23, 1983, now U.S. Pat. No. 4,494,776, and assigned to the same assignee as the present application. In accordance with the invention described in said copending application a seal load ring having a radial face and a tapered face is installed between the flared gasket portion of the piping plastic liner and frustoconically flared flange end of a section of light-weight (e.g., Schedule 10) metal piping. The radial face of the ring is provided with a plurality of concentric circular grooves to resist plastic cold flow, and the connection is effected by a split V-clamp. The outside diameter of the load ring substantially matches that of the flared flange on the piping.

The assembly contemplated by said application necessarily limited flaring of the pipe flange to something less than 90°. The reason for this limitation is that any attempt to flare light-weight or Schedule 10 piping to the standard lap diameter at a full 90° angle tends to result in an imperfect lap, cracks developing, and the material thinning excessively towards the radially outer boundary. Such problems, albeit to a lesser degree, are encountered even with a conical flare as the angle increases much above about 45°.

With plastic lined pipe there is a certain minimum requirement for the radial dimension of the gasket seal portion of the liner that is flared over a flange face or the like. Even when the flared portion is trapped in a series of annular grooves formed in the metal that backs up the flare, cold flow is of such significance that the flare must have at least some minimum radial dimension between its inside and outside diameters for each pipe size or leakage will develop in the connection. Fluid sealing between plastic gaskets, as with any gasket material, is a function of the unit pressure exerted by one member against the other. A certain minimum sealing pressure is required to contain a given level of fluid pressure. But the higher the sealing pressure the greater the tendency to cold flow. Consequently, for a given fluid pressure rating a certain minimum radial flare dimension is required in order to maintain the necessary sealing pressure within tolerable limits. These dimensions are specified in various industrial standards. For polytetrafluorothylene resin the minimum PTFE flare diameters are specified in table 2 (copied below) of the standard ASTM F423-82 entitled "Polytetrafluoroethylene (PTFE) Plastic-Lined Ferrous Metal Pipe, Fittings, and Flanges."

TABLE 2
PTFE Flare Diameter

| Nominal Pipe Size, in. | Minimum PTFE Flare Diameter, in. | (mm) |
|---|---|---|
| ½ | 1¼ | (31.8) |
| ¾ | 1 9/16 | (39.7) |
| 1 | 1⅞ | (47.6) |
| 1½ | 2 11/16 | (68.3) |
| 2 | 3 7/16 | (87.3) |
| 3 | 4⅝ | (117.5) |
| 4 | 5 15/16 | (150.8) |
| 6 | 8 | (203.2) |
| 8 | 10 1/16 | (255.6) |
| 10 | 12¼ | (311.2) |
| 12 | 14⅜ | (365.1) |
| 14 | 15½ | (393.7) |
| 16 | 17¾ | (450.9) |
| 18 | 20¼ | (514.4) |
| 20 | 22¼ | (565.2) |
| 24 | 26¼ | (666.8) |

Applying standard linear regression equations to the above data provides a straight line fit defined by the equation $Y = 0.9500134x - 1.181943$ where x is the minimum flare diameter in inches and y is the nominal pipe size in inches.

With prior joint assemblies the lap formed on the end of the pipe had to equal said minimum flare dimension. Unfortunately, it was then necessary to use a pipe having greater ductility and elongation capability in order to produce the required lap. Such pipe is generally more costly.

An object of the present invention is to provide a lined piping assembly which enables use of less expensive pipe grades in varying schedules of wall thickness without sacrifice in fluid handling performance.

SUMMARY OF THE INVENTION

In accordance with the present invention there is provided a lined piping assembly comprising in combination a component of metal piping having a connector portion flared radially outwardly at a predetermined angle to form a pipe lap having a rearwardly facing surface engageable by a joint coupling member and having a forward facing surface; a seal load ring having an inside diameter substantially matching that of said connector portion, a first face engaging said forward facing surface of said pipe lap, and a radial face on the side away from said first face; a plastic pipe lining extending out of said connector portion, through said seal load ring, where it is flared radially outwardly over said radial face of the seal load ring to form a gasket portion and thereby trap said seal load ring; the outside diameter of both said gasket portion and said seal load ring being greater than the outside diameter of said pipe lap; and a joint coupling member encircling said piping component behind said pipe lap engaging said rearwardly facing surface of said pipe lap to urge said plastic gasket portion against a mating surface of another component.

BRIEF DESCRIPTION OF THE DRAWINGS

The invention will be better understood after reading the following detailed description of the presently preferred embodiments thereof with reference to the appended drawings wherein the same reference numerals are used throughout to designate the same or similar parts and in which:

FIG. 1 is a longitudinal sectional view through a piping assembly illustrating a joint embodying the present invention;

FIG. 4 is a plan view of the radial face of a seal load ring as used in the assembly of FIG. 1, and showing the concentric annular grooves formed therein;

FIG. 5 is an enlarged fragmentary sectional view taken along line 5—5 in FIG. 4 and showing a preferred configuration for the grooves in the seal load ring as well as other details thereof;

DETAILED DESCRIPTION OF THE PREFERRED EMBODIMENTS

Figure 2:
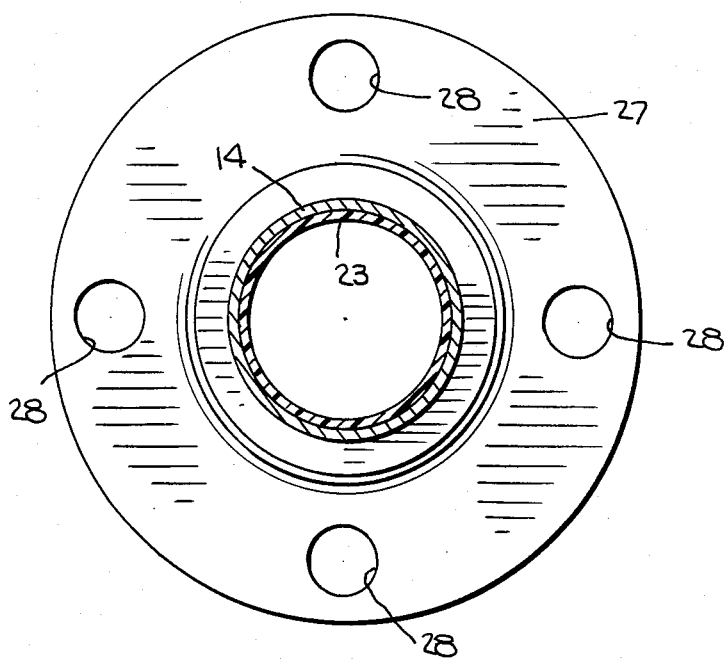
FIG. 2 is a transverse sectional view taken along line 2—2 in FIG. 1.

Referring to the drawings, a lined piping assembly constructed in accordance with the present invention is shown in FIG. 1. While the invention will be understood to be applicable to any disconnectable joint formed in an overall piping system, it is most conveniently described with reference to the connection of two pipe ends.

Figure 3:
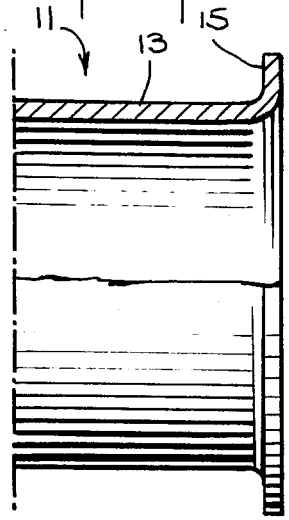
FIG. 3 is a fragmentary view, in quarter section, of the end of a section of pipe having an end lap or flange for incorporation in the assembly of FIG. 1.

The joint or assembly is designated generally by the reference numeral 10 and functions to connect one component, 11, of metal piping to another component, 12. The piping components 11 and 12 consist, respectively, of a section of metal pipe 13 and 14 having connector or end portions 15 and 16 flared radially outwardly at 90° to form a lap or flange. Details of the pipe end 11 can best be seen in FIG. 3, it being understood that the end 12 is identical although facing in the other direction in FIG. 1.

Each pipe end is provided with a respective seal load ring 17 and 18. The rings 17 and 18 are identical and are shown in detail in FIGS. 4 and 5. They have an inside diameter at 19 that substantially matches the inside diameter of the pipe sections 13 and 14, a first face 20 that engages the forward facing surface of the pipe lap 15 or 16, and a radial face 21 on the side away from the first face 20.

A plastic lining, respectively 22 and 23, extends out of the pipe sections 13 and 14, through the corresponding seal load rings 17 and 18, where the plastic is flared radially outwardly at 24 and 25 over the radial face 21 of the respective ring 17 and 18 to form a gasket portion and thereby trap the respective seal load ring 17 and 18.

A conventional Van-Stone pipe flange 26 is mounted on the pipe section 13 encircling the same behind the pipe lap 15 engaging the rearwardly facing surface of said pipe lap. An identical flange 27 is similarly mounted on section 12 engaging the rearwardly facing surface of pipe lap 16. With the installation of suitable connecting bolts (not shown) through the bolt holes 28, the flanges 26 and 27 can be drawn together in known manner to urge the plastic gasket portion 24 against the mating surface of another component, here the other gasket portion 25.

In flanged joints used in plastic lined piping systems, a frequent problem is cold flow of the plastic in the gasket region resulting in eventual leakage. To avoid this problem the seal load rings 17 and 18 are preferably provided with a plurality of concentric grooves 29 in the radial face thereof, the details of which are best seen in FIG. 5. When the assembly is tightened by tightening the bolts through the flange rings 26 and 27, the plastic from the gasket portions 24 and 25 is forced into the grooves 29. This prevents the plastic from drawing inward from between rings 17 and 18. Being able to provide the grooves 29 is an advantage not easily or economically obtainable without the inclusion of the rings 17 and 18. In order to form the grooves on the pipe lap it is necessary to machine or roll them into the metal. Such procedure is generally difficult and expensive to carry out, particularly when it is to be performed on the ends of long pipe lengths. It is difficult to produce suitable well formed annular grooves by such method. Such disadvantage is not encountered when the annular grooves are formed in a separate ring, particularly when the ring can be molded employing powder metallurgical techniques, or can be machined into a precast ring.

Referring to FIG. 5, it will be seen that the seal load rings 17 and 18 have a radiused surface 30 connecting the radial face 21 with the cylindrical surface 19. This surface 30 provides a smooth back-up for the flared liner avoiding sharp edges that might cut through the liner.

Presently, it is preferred to use Schedule 10 or Schedule 40 metal piping components for which the plastic lining for a 2" pipe, when made from polytetrafluoroethylene (PTFE) resin, is about 0.062" to 0.125" thick, and when made from fluorinated ethylene propylene (FEP) resin, is about 0.080" thick. The wall thickness of a Schedule 10, 2" pipe, is specified as nominally 0.109", and such pipe has a nominal I.D. of 2.157". In the embodiment of FIG. 1, for 2" pipe, the laps 15 and 16 have an O.D. of about 3 inches. The presently preferred seal load rings 15 and 16 are about 0.250" thick with an O.D. of about 3½" for the 2" pipe joint. The I.D. of the seal load rings is the same as that of the metal pipe. Thus, it will be seen that the respective O.D. of the pipe laps 15 and 16 is approximately 86% of the O.D. of the seal load rings 15 and 16. Expressed differently, the radial dimension of the pipe lap between its inside and outside diameters $$\left(\frac{O.D. - I.D.}{2}\right)$$

is, for the foregoing example, 0.4215". This is approximately 37% less than the 0.6715" radial dimension of said seal load ring between the inside and outside diameters of the latter.

For a 1½" pipe, the comparable dimensions that are presently preferred for Schedule 10 metal piping when lined with PTFE or FEP resin are as follows, all dimensions being nominal unless otherwise indicated:

| Liner thickness: | .062" to .125" | for PTFE |
|---|---|---|
|  | .080" | for FEP |
| Metal pipe, | wall thickness | 0.109" |
|  | Pipe I.D. | 1.657" |
|  | Lap O.D. | 2.500" |
| Seal load rings, | O.D. | 2.772" |
|  | I.D. | 1.657" |
|  | Thickness | 0.219" |

From the foregoing dimensions it follows that the respective O.D. of the pipe laps is approximately 90% of the O.D. of the seal load rings. The radial dimension of the pipe lap is 0.4215", approximately 24% less than the 0.5575" radial dimension of the seal load ring.

When Schedule 40 metal piping is used, the dimensions for the 1½" pipe size become:

| Metal pipe, | wall thickness | 0.145" |
|---|---|---|
|  | Pipe I.D. | 1.585" |
|  | Lap O.D. | 2.500" |
| Seal load rings, | O.D. | 2.772" |
|  | I.D. | 1.585" |
|  | Thickness | 0.219" |

For the Schedule 40 dimensions, the O.D. of the pipe laps is also approximately 90% of the O.D. of the seal load rings, but the radial dimension of the pipe lap is 0.4575", approximately 23% less than the 0.5935" radial dimension of the seal load ring.

The reduction in outside diameter of the pipe lap is a critical factor which enables simple forming of pipe ends by ramming, as compared to spinning, and also enables the use of lower cost, less ductile metals. In general, it is preferred that the radial dimension of the pipe lap be at least 20% less than the radial dimension of the seal load ring.

The outside diameter of the pipe lap can be reduced to the point where the radial dimension of the pipe lap approaches a mere ⅛". Such lap need only have a radial dimension sufficient to bear up under the coupling load imposed by the joint coupling member. The seal load ring provides the necessary rigid backup for the gasket seal. Due to its adequate thickness, e.g., 0.219" for 1½" pipe and 0.250" for 2" pipe, the seal load ring resists cupping and communicates a uniform loading against the entire gasket face. Such loading is independent of the reduced diameter pipe lap which no longer provides the backup for the gasket material.

Figure 6:
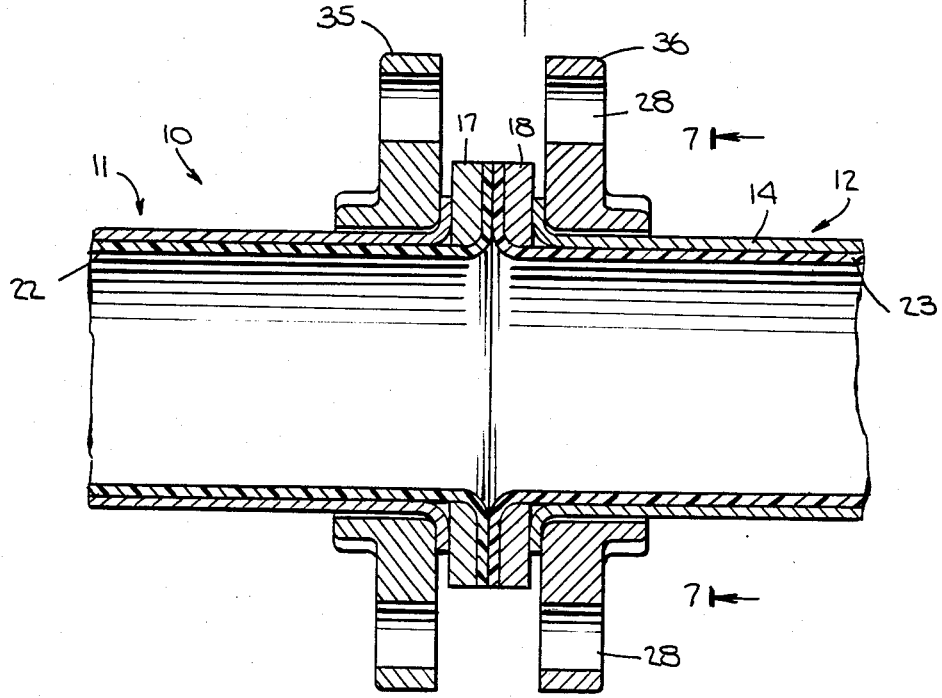
FIG. 6 is a longitudinal sectional view similar to that of FIG. 1 but showing a modification of the joint in accordance with the invention.
Figure 7:
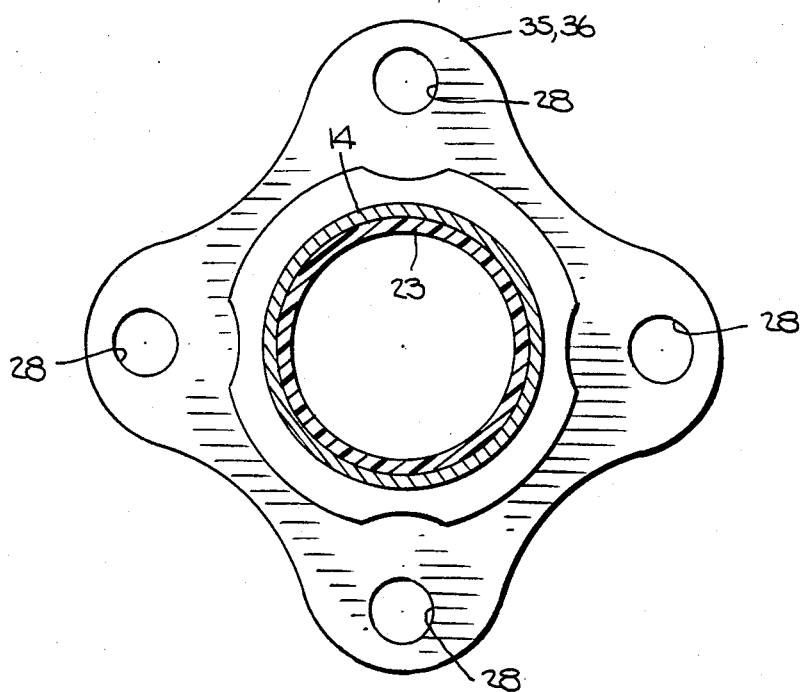
FIG. 7 is a transverse sectional view taken along line 7—7 in FIG. 6.

In the interest of maximizing the economy to be derived from the present invention, additional weight saving, cost economy and other advantages can be obtained through use of compact coupling flanges such as shown in FIGS. 6 and 7. The only difference between the joint assembly in FIGS. 6 and 7 and that shown in FIGS. 1 and 2 is the substitution of compact flanges 35 and 36 for the standard flanges 26 and 27. Comparing the illustrations will reveal the significant reduction in size.

Figure 8:
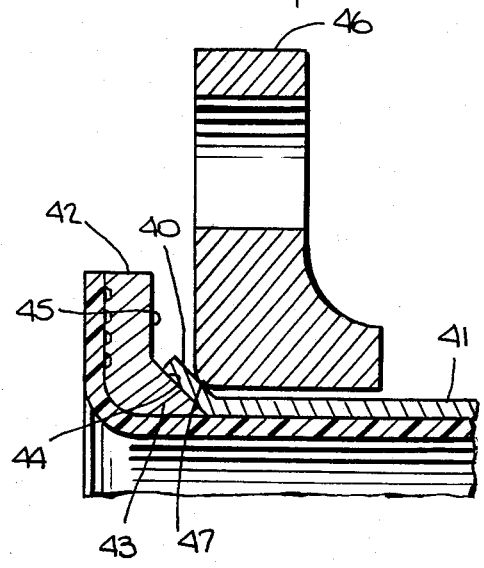
FIG. 8 is a fragmentary longitudinal sectional view through a piping assembly illustrating a further modification of the joint embodying the present invention.

The pipe joints described above all contain a 90° lap on the end of the pipe sections 13 and 14. However, the invention can be applied with advantage to pipe laps of less than 90°. For example, there is shown in FIG. 8 a modification wherein the lap 40 on the end of the pipe connector portion 41 is formed at 45°. The seal load ring 42 has a rearwardly directed tapered flange or shoulder 43 having a frusto-conical rearwardly facing surface 44 for complementing and engaging the forward facing concave surface of the lap 40. The remainder of the seal load ring 42 is similar to the rings 17 and 18, previously described, the surface 44 at its radially outer boundary joining a radially extending surface 45 of the seal load ring 42.

Figure 9:
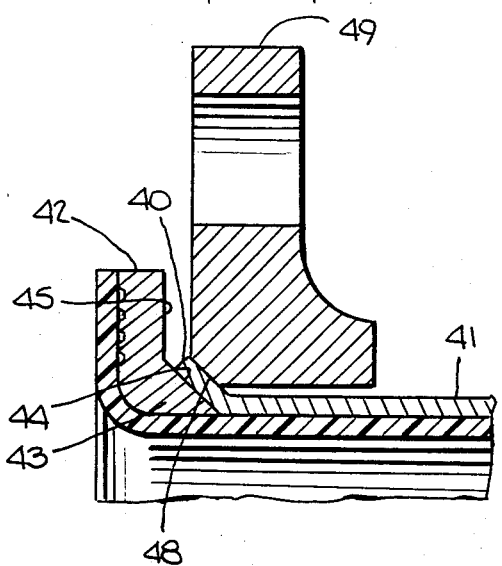
FIG. 9 is a view similar to that of FIG. 8 showing a further modification thereof.

As seen in FIG. 8, the standard bolt flange 46 has a radiused surface 47 adjacent its inside diameter which surface 47 makes circular line contact with the rearwardly facing conical surface of the lap 40. Alternatively, the radiused surface can be beveled, also at 45°, to make broad surface contact with the rearwardly facing surface of the lap 40. See the bevel 48 on the flange 49 in FIG. 9.

Having described the present invention with reference to the presently preferred embodiments thereof, it should be evident to those skilled in the subject art that various changes in construction can be effected without departing from the true spirit of the invention as defined in the appended claims. It should also be understood that the flanged connector portions that are joined need not be at the ends of lengths of pipe but can be at the ends of a stub section of such piping component formed integral with various fittings, valves, vessels or the like. The metal flange can be formed without fear of damaging the plastic liner which can best be added after the metal is flared. The seal load ring is then installed and the plastic thereafter flared to form the gasket portion and entrap the seal load ring.

What is claimed is:

1. A lined piping assembly comprising in combination a component of metal piping having a connector portion flared radially outwardly at a predetermined angle to form a pipe lap having a rearwardly facing surface engageable by a pipe flange and having a forward facing surface; a seal load ring having an inside diameter substantially matching that of said connector portion, a first face engaging said forward facing surface of said pipe lap, and a radical face on the side away from said first face; a plastic pipe lining extending out of said connector portion, through said load ring, where it is flared radially outwardly over said radial face of the seal load ring to form a gasket portion and thereby trap said seal load ring; the radial dimension of said pipe lap between its inside and outside diameters being at least 20% less than the radial dimension of said seal load ring between the inside and outside diameters of the latter; a pipe flange encircling said piping component behind said pipe lap for engaging said rearwardly facing surface of said pipe lap to urge said connector portion axially and said plastic gasket portion against a mating surface of another component.

2. A lined piping assembly according to claim 1, characterized in that said pipe lap predetermined flare angle is substantially 90°, and said first face of said seal load ring is radial and parallel to said radial face of said lap.

3. A lined piping assembly according to claim 2, characterized in that the thickness of said seal load ring between said parallel radial faces is substantially greater than the wall thickness of said pipe lap and of sufficient stiffness to resist cupping under normal operating conditions.

4. A lined piping assembly according to claim 3, characterized in that said thickness of said seal load ring is at least 1½ times said wall thickness of said pipe lap.

5. A lined piping assembly according to claim 1, characterized in that said outside diameter of said gasket portion and said seal load ring for any given nominal pipe size, y, is substantially equal to the value determined by the expression $(y+1.181943)/0.9500134$.

6. A lined piping assembly according to claim 1, characterized in that said pipe lap predetermined flare angle is less than 90°, said first face of said seal load ring is frusto-conical for complementary engagement with said forward facing surface of said pipe lap, and said first face has a radially outer boundary at a diameter substantially equal to the outside diameter of said pipe lap which outer boundary joins a radially extending further surface of said seal load ring.

7. A lined piping assembly according to claim 6, characterized in that said outside diameter of said gasket portion and said seal load ring for any given nominal pipe size, y, is substantially equal to the value determined by the expression $(y+1.181943)/0.9500134$.

8. A lined piping assembly according to claim 1, characterized in that said pipe flange is a Van-Stone pipe flange.

9. A lined piping assembly according to claim 8, characterized in that said component of metal piping is formed from metal piping no heavier than Schedule 40.

10. A lined piping assembly according to claim 1, characterized in that said component of metal piping is formed from metal piping no heavier than Schedule 40.

* * * * *